United States Patent
Maury et al.

(10) Patent No.: US 12,024,028 B2
(45) Date of Patent: Jul. 2, 2024

(54) PRIORITY BASED POWER MANAGEMENT METHOD FOR AN ELECTRIC MOTOR VEHICLE

(71) Applicant: Zero Electric Vehicles Corp., Gilbert, AZ (US)

(72) Inventors: Charles L Maury, Mesa, AZ (US); James L Maury, Mesa, AZ (US); Richard L Lewis, Essex, IA (US); Damon Kuhn, Needville, TX (US); Sean Loehr, Mesa, AZ (US)

(73) Assignee: Zero Electric Vehicles Corp., Mesa, AZ (US)

( * ) Notice: Subject to any disclaimer, the term of this patent is extended or adjusted under 35 U.S.C. 154(b) by 362 days.

(21) Appl. No.: 16/974,022

(22) Filed: Sep. 10, 2020

(65) Prior Publication Data

US 2022/0072962 A1    Mar. 10, 2022

(51) Int. Cl.
| | |
|---|---|
| *B60L 15/20* | (2006.01) |
| *B60K 35/00* | (2006.01) |
| *B60L 1/00* | (2006.01) |
| *B60L 7/10* | (2006.01) |
| *B60L 50/60* | (2019.01) |
| *B60L 58/12* | (2019.01) |
| *B60W 50/14* | (2020.01) |
| *B60W 60/00* | (2020.01) |
| *G01C 21/34* | (2006.01) |
| *G06F 16/21* | (2019.01) |

(52) U.S. Cl.
CPC .......... *B60L 15/2045* (2013.01); *B60K 35/00* (2013.01); *B60L 1/00* (2013.01); *B60L 7/10* (2013.01); *B60L 50/60* (2019.02); *B60L 58/12* (2019.02); *B60W 50/14* (2013.01); *B60W 60/0023* (2020.02); *G01C 21/3469* (2013.01); *G06F 16/21* (2019.01); *B60K 2370/169* (2019.05); *B60W 2050/146* (2013.01)

(58) Field of Classification Search
None
See application file for complete search history.

(56) References Cited

U.S. PATENT DOCUMENTS

| | | | | |
|---|---|---|---|---|
| 2009/0140700 | A1* | 6/2009 | Eberhard | B60L 58/27 |
| | | | | 320/162 |
| 2011/0224900 | A1* | 9/2011 | Hiruta | G01C 21/3469 |
| | | | | 701/533 |

(Continued)

FOREIGN PATENT DOCUMENTS

WO    WO-2009094367 A1 *  7/2009 ........... G01R 31/026

OTHER PUBLICATIONS

"Electric Vehicle", Sep. 8, 2020, Wikipedia, all. (Year: 2020).*

(Continued)

*Primary Examiner* — James J Lee
*Assistant Examiner* — Steven Vu Nguyen
(74) *Attorney, Agent, or Firm* — Fishman Stewart PLLC (57) ABSTRACT

According to the method and system of the present invention, a power management system regulates the power provided to various individual on-board vehicle systems in response to detection of vehicle operating conditions and overall anticipated vehicle energy requirements for completion of a planned route, with the objective of conserving as much energy as necessary for the vehicle to reach its planned destination.

16 Claims, 2 Drawing Sheets

(56) References Cited

U.S. PATENT DOCUMENTS

| | | | | |
|---|---|---|---|---|
| 2017/0043733 | A1* | 2/2017 | Blandin | B60K 35/00 |
| 2019/0001782 | A1* | 1/2019 | Anderson | B60G 13/14 |
| 2019/0265057 | A1* | 8/2019 | Baglino | G01C 21/3469 |
| 2020/0317057 | A1* | 10/2020 | Salter | B60K 6/26 |
| 2020/0353944 | A1* | 11/2020 | Urano | G05D 1/0088 |
| 2020/0393259 | A1* | 12/2020 | Gantt, Jr. | B60L 53/65 |

OTHER PUBLICATIONS

English Translation of CN 105082937 A Author: Yang, Qiao-sheng Title: Pure Air Conditioner Control Method and System of Electric Automatic and Pure Electric Vehicle Date: Nov. 25, 2015 (Year: 2015).*

* cited by examiner

PRIORITY BASED POWER MANAGEMENT METHOD FOR AN ELECTRIC MOTOR VEHICLE

FIELD OF THE INVENTION

The present invention relates generally to the management of electrical power and electrical signals in a motor vehicle. In the operation of a motor vehicle there are numerous vehicle systems that require electrical power for operation and that require electrical signals for the control of the operation of these systems. The present invention relates more specifically to electrically powered motor vehicles that have complex and extensive power and signal distribution requirements. In order to meet these complex and extensive power and signal distribution requirements the invention relies on innovative approaches to collecting power from numerous types of on-board electrical power generation systems and distributing the collected power to vehicle systems as needed, in a prioritized manner. Additionally, by establishing a novel signal distribution approach, the overall power consumption within the vehicle is reduced thereby allowing vehicle range to be further extended. The benefits provided by the invention will have benefit not only in fully electric and hybrid electric vehicles, but to an even greater extent in autonomous and semi-autonomous electric vehicles.

SUMMARY OF THE INVENTION

The method of the present invention implements a power management system design based upon the need to provide electrical power using a main battery source and an array of regenerative power sources. The overall power provided is used for propulsion, control systems, data collection and storage, detection of vehicle and environmental conditions and creation and display of user interfaces within an electric vehicle. In the implementation of this method, it is beneficial to address as many of the on-board systems as can reasonably be managed. These systems include, for instance, the battery management system, the electronic control unit, a storage battery pack (preferably a Li-ion battery pack), one or more electric drive motors and a number of electric motors employed for vehicle accessories, motor controllers for the electric motors, electrical converters for AC, DC and AC/DC power conversion, hydrogen fuel cell for conversion of hydrogen and oxygen into electricity, an emergency lithium ion battery for use as a backup for the regenerative systems, a power collection module for management of the power generated within all of the regenerative sources, solar film or crystalline solar collectors, aerodynamic regeneration devices, vibration regeneration devices, thermoelectric regeneration devices, environmental sensors, safety sensors, a sensor database and dashboard electronics. Each of these systems and devices require power management within the vehicle for the efficient collection and distribution of electrical power, all for the purpose of avoiding power inefficiencies. Power allocation inefficiencies cause reduced power to ultimately be available for driving the vehicle and thus do not accommodate obtaining the longest potential vehicle range.

By characterizing each vehicle system's power requirements across a wide range of operating conditions it is possible to plot the power utilization requirements of each system during operation of the vehicle, and thus to determine total vehicle power demand. Additionally, by characterizing the power generation potential of each on-board generation system across a wide range of vehicle operating conditions it is possible to plot the power generation availability during operation of the vehicle. Then, having information available as to power requirements and power availability for any given operating condition of the vehicle, power management on a comprehensive basis is possible with the objective of optimizing vehicle range. The power management system can prioritize the allocation of power to any given vehicle system on a real-time basis to avoid operation of any one or more vehicle systems at inefficient power levels (on a whole vehicle level) when vehicle operating conditions vary during the course of vehicle operation.

DESCRIPTION OF THE PREFERRED EMBODIMENTS

The present invention involves the careful characterization of the electrical power requirements of vehicle systems that consume power during operation of the vehicle as well as a thorough characterization of the on-board sources of electrical power. Even after selecting highly efficient operating components for every on-board system there remain unnecessary power-wasting conditions that arise when vehicle conditions are not optimized simultaneously for each of the operating components. The present invention provides a solution for these inefficiencies by providing a power management system that alters the manner in which vehicle operating conditions present themselves to the various on-board systems, thus allowing each on-board system to operate at or near their optimum performance levels. As one element of this power management system, adjustments to voltage and current levels are made, on a component-by-component basis to keep each vehicle component optimized. Another feature of the power management system involves temporarily reducing the power provided to, or even disabling certain vehicle systems when vehicle performance conditions deviate from those conditions under which the on-board system operates efficiently. The following discussion includes detailed descriptions of various on-board systems for the purpose of exposing operating inefficiencies, even in well-designed individual vehicle systems. Then, examples are provided to show how overall vehicle performance can be improved through the adoption of the present invention.

Battery management systems have been proposed to address some of the technical requirements associated with power management for Li-ion batteries, but heretofore there has not been a highly efficient power management method that effectively addresses the issues associated with battery management while still primarily addressing optimizing vehicle range, particularly in a manner that also optimizes the effective utilization of all of the other vehicle power sources and manages the on-board systems that use the available power.

In addition to battery management systems, electronic control units for electric vehicles have been employed for directing power to various vehicle systems, but there has not been any clear solution that primarily emphasizes extending vehicle range, but rather the emphasis has been on optimizing the performance of individual vehicle components.

One area of significant interest in the management of electrical power in an electric vehicle is the heating and air conditioning system. U.S. Pat. No. 5,501,267 discloses an A/C innovation for conserving electricity in vehicles and identifies many of the problems that still exist today. It describes an air conditioning apparatus for heating a cabin of an electric car having reduced electric power consumption. An initial setting of the heating operation is that of using a refrigerating cycle, also known as a heat pump. An average value of actual electric power consumption using the refrigerating cycle for a predetermined period is calculated. Furthermore, electric power consumption using an electric heater is calculated for obtaining the same heating capacity as that obtained by the refrigerating cycle. A switching of the heating operation from the refrigerating cycle to the electric heater takes place when it is determined that electric power consumption using the electric heater is less than that using the refrigerating cycle. While this concept addresses the overall objective of improving power consumption efficiency, it is limited to considering only a single vehicle system. According to the present invention, there is an improvement achieved by taking into consideration the actual real-time operating conditions of the vehicle. Unlike the prior approach of calculating an average value for electric power consumption, (and switching to resistance heating when a single predetermined threshold is exceeded) the present invention uses a more comprehensive characterization of power requirements over a range of operating conditions and adjusts the HVAC operating conditions only when total vehicle power requirements are optimized.

Electric motors employed in electric vehicles have been another area of extensive attention in an effort to extend vehicle range, with most of the efforts directed to the specific energy efficiency of the motor itself. Motor controllers have been employed for this purpose and have generally been special-purpose controllers limited to motor operation—not overall vehicle efficiency. As a result, there has been little attention to integrating the power management of the motor with other vehicle accessories. Thus, opportunities for energy efficiency at the vehicle level have been overlooked. One area of attention for motor controllers has been regenerative opportunities.

One area where regenerative power has been employed with some success has been braking systems, regenerative braking. In these systems, such as that described in U.S. Pat. No. 6,222,334, some portion of vehicle braking is accomplished by using the drive motor as a generator. This produces a large, albeit often short lived, regeneration opportunity. A suitable regenerative braking system includes an electric motor (usually the vehicle drive motor), a current detector for detecting the current flowing through the motor, a voltage detector for detecting the voltage present across the motor terminals, a rotational speed detector for determining the rotational speed of the motor, a brake control unit for regulating the voltage and current supplied to the motor windings and operative to control the amount of resistive torque to be generated to slow the vehicle, and consequently, the amount of power to be generated. In the design of regenerative braking systems, it has been well recognized that careful control of the regenerative activity is necessary to provide a comfortable ride while also accomplishing the desired braking. Thus, complex approaches have been developed to bring actual braking functionality into alignment with the desired braking activity. At least one such approach considers the target generated power needed to accomplish the desired braking and employs a brake calculating unit for calculating a target generated power from the voltage of a power supply of the electric motor, the rotational speed of the electric motor, and a predetermined torque command, an actual generated power calculating unit for calculating an actual generated power of the electric motor from the armature current of the electric motor and the voltage of the power supply of the electric motor, a manipulative quantity calculating unit for calculating a manipulative quantity to eliminate the difference between the target generated power and the actual generated power from the difference according to a feedback control process, and a regenerative control unit for controlling the armature current of the electric motor depending on the manipulative quantity upon regenerative braking. Further details of this approach are shown in U.S. Pat. No. 6,222,634. While this approach goes to great lengths to address the performance of the regenerative braking system, it does not address power management in any manner that takes into account truly extending vehicle range. The provision of electrical power is addressed, but not optimization in relation to the overall conditions existing in the vehicle. According to the present invention, accommodations are made for the high level of power generated when employing regenerative braking, but without compromising overall vehicle efficiencies. For instance, vehicle systems exist that provide information regarding the vehicle's proposed routs, including downhill road segments when regenerative braking can be anticipated. According to the present invention, steps can be taken in anticipation of the use of the brakes. One example is the provision of a high capacity capacitor that is suitable for collecting the very high-power output of a regenerative braking system. This power is often produced at levels that cannot be efficiently reintroduced into a vehicle battery system. To permit full recapture of the highest levels of peak power production from regenerative braking, the high capacity capacitor can be discharged before the downhill road segment is reached so its full capacity can be used to collect the regenerative braking system's output. In an optimized implementation, the power provided from regenerative braking will be provided to the battery system at the highest recharge rate that is compatible with efficiently and quickly recharging the batteries, then to recharging any back-up batteries and then excess power will be provided to the operating on-board systems which can draw power from the regenerative braking system instead of from the batteries and any remaining excess power can be provided to the high capacity capacitors. This optimizes the recharging of batteries without wasting the excess power provided from the regenerative braking.

Regenerative braking is also available in hybrid vehicles which have an internal combustion engine and an electric motor for assisting in the output drive power of the internal combustion engine as propulsive power units for the vehicles. When such a hybrid vehicle is accelerated, the drive power of the internal combustion engine and also the drive power of the electric motor are applied to the drive wheels of the hybrid vehicle. In this manner, the output drive power of the internal combustion engine is reduced, the consumption of the fuel by the engine is lowered, and the exhaust performance of the engine is increased while at the same time the vehicle achieves a necessary acceleration capability. The electric motor can also operate as an electric generator. When the hybrid vehicle is decelerated, the kinetic energy of the vehicle is imparted from the drive wheels to the electric motor, which then operates as the electric generator. When the e generator generates electric energy, it produces a regenerative torque which is applied to resist forward movement of the vehicle (regenerative braking). The generated e energy is retrieved to charge a power supply of the electric motor, e.g., a battery, an electric double-layer capacitor, or the like for effective energy utilization. This also provides range extension for the vehicle due to reduced requirements for use of fuel for battery recharging. As with the fully electric vehicle described above, hybrid vehicles can benefit from a vehicle-level power management approach that is not limited in its focus to individual on-board systems such as regenerative braking. The present invention addresses this shortfall in the prior approaches.

A list of devices and functions using these management technologies includes, but is not limited to: battery management systems for main batteries and backup batteries, electronic control units for engine management, electronic control units for management of vehicle electronic systems, controllers for electric motors, power converters (DC-DC, DC-AC and AC-DC), hydrogen fuel cell management, power collection systems, regenerative power sources (solar, aero, vibration, thermoelectric), HVAC systems, entertainment systems, communication systems, dashboard electronics, and all manner of sensor systems. The table below provides more detail for some of these systems and provides reference numbers corresponding to the drawings:

| Device | Function |
|---|---|
| 100 Electronic Control Unit | Control the use of vehicle electronics |
| 200 Main Li-Ion Battery Pack | Supply electricity to the whole vehicle |
| 201 Expandable Battery Modules | Supply electricity to the whole vehicle |
| 300 Motor Controller | Control the use of the Electric Motors |
| 400 Battery Management System | Control the use of the main Li-Ion batteries |
| 401 Battery Charging Module | provides an interface from external power |
| 402 EV Charger connector | provides connection point for external power |
| 501 Electric Motors | Supply motion and braking to the vehicle |
| 510 DC-AC Inverter | Convert between AC and DC (either way) |
| 511 DC-DC Converter | Convert a level of DC to another level of DC |
| 520 Sensor Database | Store data from all the Sensors |
| 550 Sensor Collection | Wide range of sensors for vehicle systems |
| 551 Environmental Sensors | Detect environmental parameters |
| 552 Safety Sensors | Detect other parameters needed for safety |
| 560 Hydrogen Fuel Cell | Convert Hydrogen/Oxygen into electricity |
| 562 Hydrogen Fueling system | On-board interface to hydrogen supply source |
| 600 Dashboard Electronics | Driver interface for display and control |
| 700 Power Collection Module | Collect power from all regenerative sources |
| 701 Solar Films | Convert solar energy into electricity |
| 702 Aero Regens | Convert wind energy into electricity |
| 703 Vibration Regens | Convert linear motion energy into electricity |
| 704 Thermoelectric Regens | Convert thermal energy into electricity |
| 710 Emergency Battery | Extra Battery for backup of main batteries |

An objective of the present invention is to implement systematic electrical and mechanical control of an electric vehicle employing a comprehensive analysis of the power requirements of each operating system over a range of operating conditions and causing the various operating systems to operate under operating conditions that facilitate improved vehicle travel range.

The detailed description set forth herein is intended as a description of various configurations of the subject technology and is not intended to represent the only configurations in which the subject technology can be practiced. The drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using a wide range of embodiments. In one or more instances, structures and components are shown and described in functional and/or block diagram form in order to avoid obscuring the concepts of the subject technology.

The Significant Vehicle Systems
The Battery Management System (BMS)

The BMS is any electronic system that manages a rechargeable battery pack. It protects the battery pack from operating outside its safe design parameters, monitors its state of operation, calculates any secondary data, reports the detected and calculated data, and controls the batteries' environment. A description of an existing type of BMS is provided in United States Patent Application Number 20200262303 published Aug. 20, 2020 wherein it is explained that an electric vehicle charging system includes an electric vehicle including a bidirectional charging unit and a battery management system (BMS), a direct current (DC) fast charging system, and an alternating current (AC) slow charging system. The bidirectional charging unit has a first communication unit configured to receive charging type information from the DC fast charging system or the AC slow charging system through a first communication method and a second communication unit configured to perform communication with the BMS through a communication protocol. The charging type information transmitted and received between the AC slow charging equipment and the bidirectional charging unit includes at least one piece of information among supporting application protocol request and response information, session configuration request and response information, service search request and response information, service detail request and response information, payment service selection request and response information, payment detail information request and response information, authentication request and response information, AC charging parameter search request and response information, power detail information request and response information, charging state information request and response information, metering reception information request and response information, and session termination request and response information.

In another embodiment, the charging type information transmitted and received between the DC fast charging equipment and the bidirectional charging unit includes at least one piece of information among supporting application protocol request and response information, session configuration request and response information, service search request and response information, service detail request and response information, payment service selection request and response information, payment detail information request and response information, authentication request and response information, DC charging parameter search request and response information, power detail information request and response information, charging state information request and response information, metering reception information request and response information, and session termination request and response information.

As is evident from the complexity of this set of systems, there are many design considerations involved in operating the BMS. However, prior systems have addressed these complexities in a stand-alone manner rather than taking a holistic approach with respect to the entire vehicle. According to the present invention, management of the battery system is integrated with overall vehicle system management for the purpose of eliminating as many power-robbing inefficiencies as possible. A key source of power losses is in the interface between individual stand-alone systems. A superior design approach involves identifying opportunities to balance out conflicting power needs among the entirety of the vehicles systems.

The Electronic Control Unit (ECU)

The ECU is any electronic system that controls actuators on a vehicle to regulate the performance of numerous electrical and mechanical devices on-board the vehicle. It detects values from an array of sensors within the vehicle, interprets data from a database and readjusts the actuators accordingly. A thorough description of a one type of ECU is provided in United States Patent Application 20200276979 to Ogura; Takashi; et al. dated Sep. 3, 2020 for a "CONTROLLER FOR VEHICLE". The description includes a vehicle that includes a power storage device, a monitoring unit, a system main relay (hereinafter, also referred to as "SMR"), a power control unit (hereinafter, also referred to as "PCU"), a plurality of motor generators (hereinafter, also referred to as "MGs"), an internal combustion engine, a power split device, a drive shaft, a driving wheel, and an ECU (Electronic Control Unit). The vehicle further includes a sensor group, a communication unit, a navigation device, and a display device, all of which are used in connection with the ECU.

The power storage device is mounted on the vehicle as a driving power supply (i.e., a motive power source) for the vehicle. The power storage device includes a plurality of stacked batteries. Each of the batteries is a secondary battery such as, for example, a nickel-metal hydride battery or a lithium ion battery. Alternatively, each of the batteries may be a battery having a liquid electrolyte between a positive electrode and a negative electrode or may be a battery having a solid electrolyte (all-solid-state battery). The power storage device may be any power storage device as long as it is a rechargeable DC power supply, and even a large-capacitance capacitor can also be used.

The monitoring unit monitors the state of power for the power storage device. Specifically, the monitoring unit includes a voltage sensor that detects a voltage of the power storage device, a current sensor that detects a current input to and output from the power storage device, and a temperature sensor that detects a temperature of the power storage device. Each sensor outputs a signal indicating the result of detection to the ECU.

The SMR is electrically connected the PCU and the power storage device. When the SMR is closed, electric power is supplied from the power storage device to the PCU. When the SMR is opened, electric power is not supplied from the power storage device to the PCU.

In accordance with a control signal provided from the ECU, the PCU converts DC power stored in the power storage device into AC power and supplies the AC power to the motor generators. The PCU also converts AC power generated by the motor generators into DC power and supplies the DC power to the power storage device. The PCU controls states of the motor generators individually. For example, the PCU can bring the motor generator into a power running state while bringing the motor generator into a regenerative state. The PCU includes, for example, two inverters provided to correspond to the motor generators, and a converter that boosts a DC voltage supplied to each inverter into a voltage that is equal to or higher than an output voltage of the power storage device.

A sensor group includes various sensors that detect an external situation of the vehicle and detect the vehicle's traveling state. Specifically, the sensor group includes a camera, a radar, a LIDAR (Laser Imaging Detection and Ranging), a vehicle speed sensor, an acceleration sensor, and a gyro sensor. Various types of information detected by the sensor group correspond to traveling information that is used for decision making within the various vehicle systems.

A camera captures an image of the external situation of the vehicle and outputs the image information about the external situation of the vehicle to the ECU.

A radar transmits a radio wave (e.g., millimeter wave) to the surroundings of the vehicle and receives a radio wave reflected by an obstacle to thereby detect the obstacle. The radar outputs, for example, a distance to the obstacle and a direction of the obstacle relative to the ECU as the 'obstacle information' about the obstacle.

A LIDAR unit transmits light (typically, ultraviolet rays, visible rays or near-infrared rays) to the surroundings of the vehicle and receives light reflected by an obstacle to thereby measure a distance to a reflection point and detect the obstacle. The LIDAR outputs, for example, a distance to the obstacle and a direction of the obstacle relative to the ECU as the obstacle information.

A vehicle speed sensor is provided at a driving wheel, drive shaft or the like of the vehicle. A vehicle speed sensor detects, for example, a rotation speed of the driving wheel and outputs the vehicle speed information including a speed of the vehicle to the ECU.

An acceleration sensor includes, for example, a front-back acceleration sensor that detects an acceleration of the vehicle in a front-back direction, and a lateral acceleration sensor that detects a lateral acceleration of the vehicle. The acceleration sensor provides an output to the ECU including the vehicle's acceleration information including both the acceleration of the vehicle in the front-back direction and the lateral acceleration of the vehicle.

A gyro sensor detects an inclination of the vehicle from a horizontal direction. Specifically, the gyro sensor detects an inclination of the vehicle in the front-back direction relative to the horizontal direction and an inclination of the vehicle in a right-left direction relative to the horizontal direction. The gyro sensor outputs the result of detection to the ECU as the gradient information of the travel path of the vehicle.

A communication unit includes an inter-vehicle communication device and a local bidirectional communication device. The inter-vehicle communication device wirelessly communicates with other vehicles around the vehicle. In inter-vehicle communication, information such as start, stop, acceleration, and deceleration is, for example, transmitted from a vehicle traveling at the front to a vehicle traveling at the back. The bidirectional communication device bidirectionally communicates with the vehicle management center through a communication network such as the Internet.

A navigation device includes a GPS (Global Positioning System) receiver that identifies a current location of the vehicle based on GPS signals, and a map data storage unit that stores map data. The navigation device performs various navigation processes of the vehicle using the information (GPS information) of the current location of the vehicle identified by a GPS receiver. More specifically, the navigation device calculates a traveling route from the current location of the vehicle to a destination based on the GPS information of the vehicle and the road map data stored in the map data storage unit, and outputs the information about the traveling route to the ECU.

A display device displays information for providing various pieces of information to the outside of the vehicle. The display device is, for example, a liquid crystal display, an electric bulletin board or the like. The display device displays various pieces of information in accordance with an instruction provided from the ECU.

The ECU also receives the signals from the respective sensors and outputs the control signals to the respective devices, and also controls the respective devices. The control can be implemented not only by software but also by dedicated hardware (electronic circuit).

The ECU includes an information obtaining unit, a storage unit and a control unit. The information obtaining unit obtains the result of detection by each sensor from the sensor group. Also, the information obtaining unit obtains, from the communication unit, information received from the outside (another vehicle and/or the management center). The storage unit includes a ROM (Read Only Memory) and a RAM (Random Access Memory), and stores a program executed by the ECU and the like. The control unit expands the program stored in the ROM into the RAM for execution.

There is also a self-diagnosis and failure diagnosis feature in the ECU pursuant to which the ECU executes a self-diagnosis for diagnosing whether or not each device (such as the power storage device, monitoring unit, motor generators, engine, a steering device, a braking device, and a direction indicator) of the vehicle has a failure.

Although the ECU has been described here as though it is a single physical unit, it is to be understood that this description relates to only this embodiment. In practice the functional aspects of the ECU can be implemented though deployment of multiple physical devices that allocate the ECU functionality, or even provide redundancy—particularly of critical functions.

While the ECU has a wide array or vehicle responsibilities, one thing missing from the previous approaches has been the overall analysis of individual power requirements of each of the on-board systems, the recording of the power requirements as a function of vehicle operating conditions and then the regulation of the on-board systems for the purpose of extending vehicle range.

The Main Li-Ion Battery Pack

The main Lithium-Ion battery pack is an array of a type of rechargeable batteries used to power a vehicle with electricity—so named because they use an intercalated lithium compound as the material for the positive electrode and a graphite at the negative electrode. These batteries have high energy densities and low self-discharge rates allowing long life spans.

Additional Li-Ion Battery Packs

These Lithium-Ion battery packs are an option for the user to add an extra tray to the main Lithium-Ion battery pack for extending power capability. Three options are offered; one installed near the front of the vehicle, or one installed near the rear of the vehicle, or both.

The Electric Motors

The Electric Motors are traction motors for propulsion and can be either DC or AC type with any number of them on an electric vehicle. They are primarily powered by the main Li-Ion battery pack and controlled by a number of electronic systems depending on the vehicle operating conditions. For instance, in normal driving the motor ECU provides primary control, but during autonomous vehicle operation, the motor control is additionally regulated by the autonomous system. The electric motors can also provide electricity when in a mode of regeneration by rotational motion as described herein in greater detail with reference to regenerative braking.

The Motor Controllers

The Motor Controller is any electronic system that can coordinate the performance of the electric motors such as a manual or automatic means of starting and stopping, forward or reverse rotation, selecting and regulating the speed, regulating or timing the torque, coasting and braking for regeneration of electricity, and protecting against overloads and electrical faults.

Autonomous Vehicle Driving Control

In an autonomous vehicle there is an autonomous driving control device installed to control autonomous driving of the vehicle. The autonomous driving control device implements autonomous driving at a predetermined number of levels as driving automation levels. In a typical autonomous vehicle, an autonomous driving control device controls the driving of the vehicle at level 0, level 1, level 2, and level 3. The level 0 is a level at which the driver performs main controls for running of the vehicle. The main controls refer to controls of acceleration, deceleration, steering, and others of the vehicle. Level 1 is a level at which only a single one of the main controls is automatically performed. Level 2 is a level at which two or more of the main controls can be executed at the same time in a situation where the driver can continuously monitor the running state of the vehicle and perform an operation as necessary. At level 2, it is detected whether the driver is continuously monitoring the running state of the vehicle and perform an operation as necessary by detecting that the driver is holding the steering wheel of the vehicle. Level 3 is a level at which two or more of the main controls can be executed at the same time in a situation where the driver can perform an operation only under limited conditions. The levels 0 to 3 may be the same as the levels 0 to 3 that are defined by U.S. Department of Transportation Road Traffic Safety Administration (NHTSA), for example.

The autonomous driving control device includes a first control device, a second control device, a first storage part, a second storage part, a load control unit, and a failure detection unit. The first control device includes a CPU and a RAM. The first control device is formed as an electronic control unit (ECU). In normal times, the RAM has a first autonomous driving program loaded therein. By executing this program, the CPU serves as a first autonomous driving functional unit Similarly, in normal times, the RAM has a first multimedia program loaded therein. By executing this program, the CPU serves as a first multimedia functional unit. The normal times refers to a situation in which no failure occurs in the first control device or the second control device.

The first autonomous driving functional unit is a functional unit for executing autonomous driving. Specifically, the first autonomous driving functional unit performs image recognition based on captured images obtained by, out of stereo cameras included in the vehicle, a right camera on the right side as seen in a moving direction of the vehicle, and detects the type and size of a preceding vehicle, pedestrians, obstacles, and others. The first MM functional unit is a functional unit for implementing the multimedia function. Specifically, the first MM functional unit controls an audio device included in the vehicle. The second control device is configured in the same manner as the first control device. Specifically, the second control device includes a CPU and a RAM. The RAM has a second autonomous driving program loaded therein. By executing this program, the CPU serves as a second autonomous driving functional unit. Similarly, in normal times, the RAM has a second multimedia program loaded therein. By executing this program, the CPU serves as a second multimedia functional unit.

The second autonomous driving functional unit is a functional unit for executing autonomous driving. Specifically, the second autonomous driving functional unit performs image recognition based on captured images obtained by, out of the stereo cameras included in the vehicle, a left camera on the left side as seen in the moving direction of the vehicle, and detects the type and size of a preceding vehicle, pedestrians, obstacles, and others.

The second MM functional unit is a functional unit for implementing multimedia functions. Specifically, the second MM functional unit controls a navigation device included in the vehicle. The first control device and the second control device are powered by different power source systems. Alternatively, the first control device and the second control device may be powered by the same power source system.

The first storage part and the second storage part have the first autonomous driving program, the second autonomous driving program, the first MM program, and the second MM program stored therein in advance. The first storage part is connected to the first control device. The programs stored in the first storage part can be loaded into the RAM of the first control device. Similarly, the second storage part is connected to the second control device. The programs stored in the second storage part can be loaded into the RAM of the second control device.

The first MM program and the second autonomous driving program are programs having the similar amount of data. Similarly, the second MM program and the first autonomous driving program are programs having the similar amount of data.

The load control unit controls loading and unloading of programs into and from the RAM of the first control device, and controls loading and unloading of programs into and from the RAM of the second control device. In normal times, when the ignition of the vehicle is turned on, the load control unit loads the first autonomous driving program and the first MM program into the RAM of the first control device. The load control unit also loads the second autonomous driving program and the second MM program into the RAM of the second control device. In an autonomous driving control process, when a failure is detected in the first control device or the second control device, the load control unit reads programs different from the programs in normal times from the first storage part or the second storage part and loads the same into the RAM or the RAM.

The failure detection unit detects a failure in each of the first control device and a failure in the second control device. The failure detection unit regularly performs communication (as a watchdog) with the first autonomous driving functional unit of the first control device to detect the normality of the first control device. When there is no response from the first MM functional unit, the failure detection unit detects that the first control device has failed. Similarly, the failure detection unit regularly performs communication with the second autonomous driving functional unit of the second control device to detect the normality of the second control device. When there is no response from the second autonomous driving functional unit, the failure detection unit determines that the second control device is failed.

In a typical operation, the load control unit and the failure detection unit are implemented by single ECUs different from the first control device and the second control device. The load control unit and the failure detection unit may be different from each other and may be implemented by ECUs different from the first control device and the second control device.

The first storage part and the second storage part have stored in advance programs that are intended to implement autonomous driving and are different from the first autonomous driving program and the second autonomous driving program. By executing these programs, the ECU and the CPU also serve as a functional unit that implements a function for autonomous driving other than a function for performing image recognition based on captured images obtained by the stereo cameras.

The autonomous driving control device is electrically connected to a sensor and is configured to receive a signal of results of detection by the sensor. Examples of the sensor include a vehicle velocity sensor, an acceleration sensor, a global navigation satellite system (GNSS) sensor, a stereo camera, a millimeter wave radar, Light Detection And Ranging or Laser Imaging Detection And Ranging (LiDAR), a yaw rate sensor, a steering angle sensor, a handle sensor, and others. The handle sensor is a sensor for detecting whether the driver is holding the steering wheel.

The autonomous driving control device is electrically connected to an engine ECU, a brake ECU, and a steering ECU. The engine ECU controls operations of an engine. Specifically, the engine ECU controls various actuators to control opening/closing operations of a throttle valve, ignition operation of an ignitor, opening/closing operations of an intake valve, and others. The brake ECU controls a brake mechanism. The brake mechanism includes a device group (actuators) relating to brake control such as a sensor, a motor, a valve, and a pump. The brake ECU determines a braking timing and braking amount (the amount of brake application), and controls the devices constituting the brake mechanism to obtain the determined braking amount at the determined timing. The steering ECU controls a steering mechanism. The steering mechanism includes a device group (actuators) relating to steering such as a power steering motor. The steering ECU determines the amount of steering (steering angle) based on measurement values obtained from the yaw rate sensor and the steering angle sensor, and controls the devices constituting the steering mechanism to produce the determined amount of steering. The autonomous driving main control unit controls the engine ECU, the brake ECU, and the steering ECU to implement autonomous driving.

In the autonomous driving control device configured as described above, executing an autonomous driving control process makes it possible to, even if the first control device or the second control device has failed, suppress a decrease in the continuity of the autonomous driving function and suppress upsizing of the autonomous driving control device and an increase in power consumption.

Unmanned vehicles, also referred to more commonly as drones, may be mobile platforms capable of performing automated actions. Drones may provide many benefits over manned vehicles, including lower operating costs, fewer dangers of usage and/or travel, and increased accessibility to areas that may be dangerous for normal human travel. Moreover, drones may capture specific sensor data (e.g., audio, image, video, and/or other sensor data) at a target location, deliver goods (e.g., packages, medical supplies, food supplies, engineering materials, etc.) to the target location, handle objects (e.g., retrieving objects, operating equipment, repairing equipment, etc.) at the target location, and so forth without the need for a human to perform such actions. However, these drone devices require power to maintain functionality, which usually comes in the form of a rechargeable battery or other fuel source. For example, a drone delivering an item over a long range may be required to stop for recharging, which delays delivery time. This may be harmful where the drone is delivering time sensitive materials, such as human organs, perishable items, or important items that are required by a specific time. Similarly, robotics and electrical vehicles may require power while they are operating in order to prevent failure and inoperability that may inconvenience owners and operators of such devices and cause damages. Thus, additional time spent recharging or refueling can negatively impact operation of such devices.

Due to the complexity of any autonomous driving system, there has been little or no effort directed to managing the power requirements of the autonomous driving system. However, according to the present invention it is entirely feasible to consider system power requirements during operation of the vehicle, even in a fully autonomous manner. The inventive concept involves identifying the level of power required for various alternative possible operating modes and then selecting the operating mode that is most consistent with extending the vehicle's travel range.

The DC-AC Inverter

The DC to AC Inverter is an electronic device that converts direct current (DC) to alternating current (AC) exhibiting voltage, current and frequency of a signal.

The AC-DC Converter

The AC to DC Converter is an electronic device that converts alternating current (AC) to direct current (DC). This is frequently as simple as a bridge rectifier and a capacitor.

The DC-DC Converter

The DC-DC Converter is a power converter that either steps up a DC voltage while stepping down the current from its input to its output (a Step-Up Converter, "Boost") or steps down a DC voltage while stepping up the current from its input to its output (a Step-Down Converter, "Buck"). In either case, power is conserved by the equation; $P=EI$ (Power=Voltage×Current).

The Hydrogen Fuel Cell

The Hydrogen Fuel Cell is an electrochemical cell that converts chemical energy of Hydrogen and Oxygen into electricity. It consists of an anode, a cathode, and an electrolyte that allows positively charged hydrogen ions (protons) to move between the two sides of a fuel cell. The ions move through the electrolyte while electrons flow from the anode to the cathode through an external circuit producing DC electricity. At the cathode, another catalyst causes the ions, electrons, and Oxygen to react forming high-temperature water as the exhaust.

An explanation of the state of the art for hydrogen fuel cells was provided in United States Patent Application number 20190152330 dated May 23, 2019. As stated, research regarding hydrogen fuel cell vehicles using environmentally friendly fuel cells as alternative energy in the future is being actively conducted. The fuel cell generates electric energy through an electrochemical reaction using hydrogen as a reaction gas. However, due to a structural problem of the fuel cell, it may be difficult to promptly supply power to a load when starting and to rapidly respond to a sudden change in load. In addition, since the fuel cell has optimal efficiency within a specific range of output density, the fuel cell may frequently deviate from a high-efficiency output density.

Further, since the fuel cell has only a characteristic of supplying power unilaterally, the fuel cell may not absorb or store regenerative power regenerated when a driving motor for a vehicle is stopped and therefore is disadvantageous for an efficient use of energy. Accordingly, a fuel cell vehicle generally includes a hybrid driving system in which a high voltage battery is mounted as an auxiliary energy source. However, a parallel type hybrid driving system conventionally used may require a substantially sized bidirectional converter which may be suitable for a high power load however it may well have a reduced efficiency due to a power loss inherent in the use of a bidirectional converter.

The Emergency Battery

The Emergency Battery can be any single battery or set of batteries that is used as a backup source of electricity, as a collection of energy storage from all the regenerative sources of electricity, and to assist in recharging the main Li-Ion Battery pack. This is preferably another Li-Ion battery with sufficient energy storage capacity to meet emergency requirements but not big enough to necessarily handle the full range of battery demands for typical operation of the vehicle. Suitable batteries of this type may include small batteries originally specified for use in a motorcycle, a boat or an ATV.

The Power Collection Module (PCM)

The PCM is any electronic system that combines the power supplied by multiple regenerative sources of electricity and provides an output source of electricity to be used not only by all the smaller electrical devices on a vehicle, but also to charge the emergency Li-Ion battery, the main Li-Ion Battery Pack and/or the optional additional Li-Ion batteries. A power collection module is disclosed in co-pending and commonly owned United States Patent Application entitled "Power Collection Module" filed on Sep. 1, 2020. As disclosed therein, the driving range of an electrically powered motor vehicle can be extended by employing a plurality of different types of regenerative power devices on the vehicle for producing electricity and collecting the power generated by each in an efficient module having both DC to DC step up and DC to DC step down converters that output the collected power at a predetermined voltage for selectively providing power to the vehicle's storage battery system or directly to a vehicle accessory. As further disclosed therein, in the management of electrical power in a motor vehicle it is desirable to have a consistent source of electricity available at all times. The source of supply is preferably available at a predetermined voltage level and at power levels consistent with peak power demands. When power is being generated from renewable sources, it is not always possible to generate power when and where needed and at the desired level of power. Thus, energy storage systems and devices have been created in an effort to keep the stored energy available for peak power demands. Typical of such storage systems are banks of rechargeable batteries.

Numerous types of renewable energy sources have been identified and include solar energy, thermal energy, chemical energy, potential energy, and kinetic energy. There are many well-known mechanisms available for capture of the energy from these sources for the production of electricity. The present invention has particular utility in the capture and management of solar, potential and kinetic energy for use in vehicles, and more specifically energy available from regenerative braking, aerodynamic energy capture, vibration energy capture, and solar energy capture. Systems on a vehicle that capture these energy sources for creation of electricity are referred to as energy recapture systems.

With renewable energy sources, there is the possibility of providing the electrical power generated directly to on board vehicle systems without utilizing the battery system, thereby eliminating the energy losses associated with charging and discharging the batteries. This advantage becomes evident when the vehicle battery system is fully charged and the vehicle is not operating. Allowing systems such as air conditioning to operate from the power produced from renewable sources provides the possibility of extending the vehicles range once operation resumes because the batteries have remained fully charged.

The energy from all these renewable sources can be converted into electricity by known devices but the outputs from these power generation devices have various different voltages and current levels. Also, their availability is not consistent due to variations in the environment and operation of the vehicle. For instance, braking is intermittent, so regenerative braking produces intermittent electrical power. Similarly, solar energy is a function of the weather and intensity and angle of the sun while wind energy is a function of vehicle speed—also a variable. Vibration energy also varies as a function of the terrain over which the vehicle is travelling. An objective of the collection of the power generated from these various energy sources is to combine and provide a source of electrical energy to be used not only by all the electrical devices on a vehicle, but also to charge the storage battery system. In an electric vehicle this would be the storage battery system that powers the vehicle. The device that performs this power collection function is referred to herein as a Power Collection Module (PCM).

The Solar Films and Fixed Solar Panels

The Solar Films are arrays of solar cells on a flexible panel that converts solar energy into electricity by the photovoltaic effect. The voltage or current or resistance will vary when exposed to light and depends upon the intensity. Fixed solar panels are generally crystalline silicon-based, but they also convert solar energy into electricity.

The Aero Regenerators

The Aero Regenerators are constructed of a plurality of electrical/mechanical devices that convert wind energy into electricity. Energy from the apparent wind can be harnessed in a moving vehicle in an efficient manner relative to pre-existing approaches. This is accomplished by providing a system in which wind powered generation devices are positioned at locations on the vehicle where there is high air pressure resulting, for the most part, from forward facing portions of the vehicle impacting the air as the vehicle progresses. At these locations, wind energy is concentrated and can be captured efficiently by a wind-based generator while at the same time avoiding the creation of significant incremental aerodynamic drag in the vehicle. By directing this energy to the onboard vehicle energy requirements there is a net improvement in the vehicle's travel range. The invention has great utility in electric and hybrid vehicles, extending the range significantly.

Figure 1:
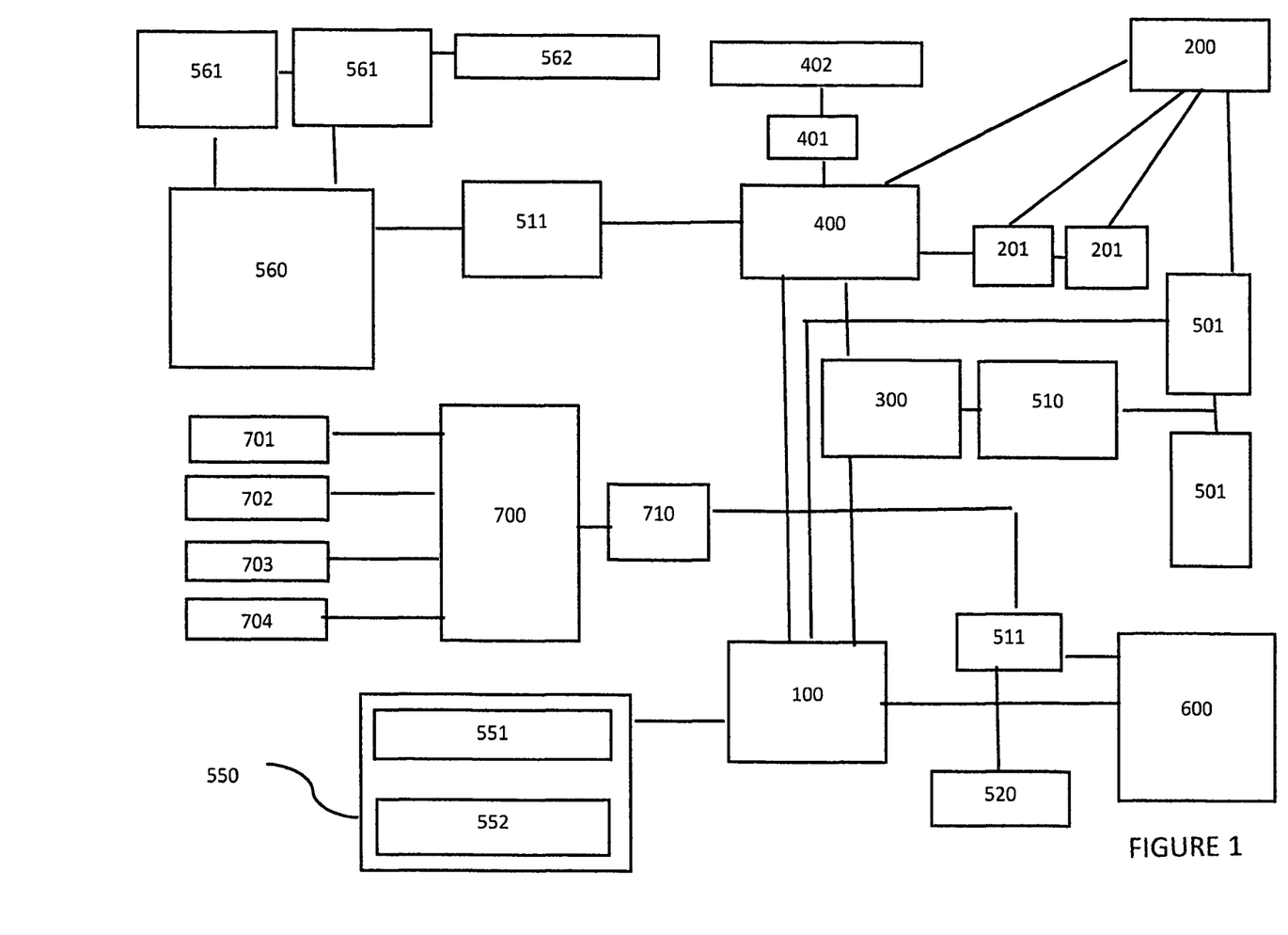
FIG. 1 illustrates a logical interconnection of vehicle systems in accordance with the invention
Figure 2:
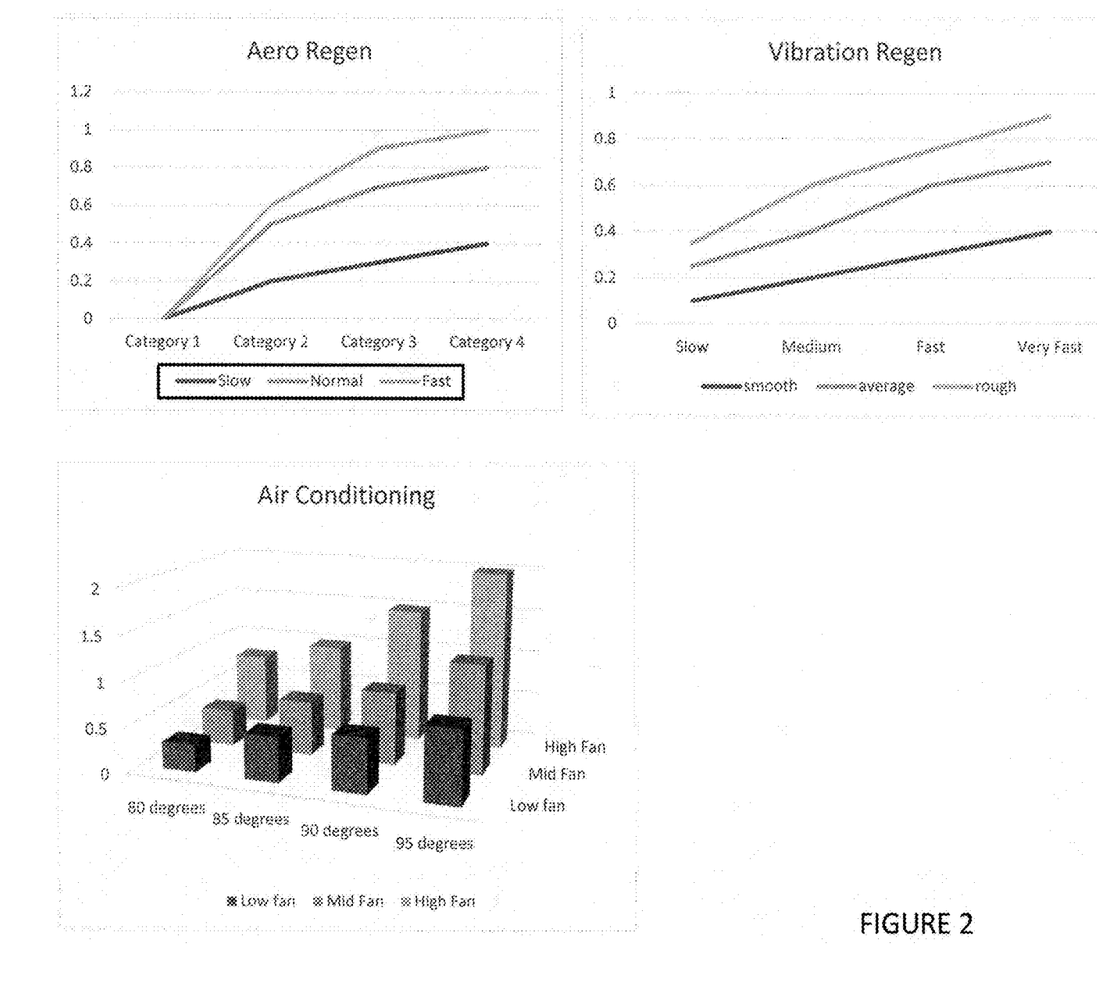
FIG. 2 illustrates power utilization curves for a variety of on-board vehicle systems.

FIG. 2 includes a representation of a possible power generation curve associated with employment of an aero regen device. Since multiple devices may be employed, each at a different location on the vehicle, there may be a separate analysis of the performance of each, and each may be considered when calculating the prospective energy that can be retrieved from each separately.

The Vibration Regenerators

The Vibration Regenerators have an array of electrical/mechanical devices that converts linear motion energy into electricity. Several US Patents and Articles have come out with reports on "Harvesting Vibration Energy" that shows many different ways to capture energy from vibrations on vehicles and using it to power small electronics or charge the battery. The preferred vibration regenerators use a structure where a rare earth magnet travels in a singular dimension of vertical length between a set of upper and lower coils using magnet wire. The magnet is suspended within a tube by springs specifically selected allowing the magnet to travel freely and equally vertically. The concept is according to Faraday's Law that when either pole of a magnet is in motion that either approaches a coil of wire or is retracting away from it, the magnetic lines of force extending outward from the poles will intersect the coil wiring, either perpendicularly or at an angle greater than zero, thereby creating an electric current flow in the coil. Both the poles (North or South) and the direction of the magnet travel determine the direction of the current flow.

Because the vibrations applied to the Regens from vehicle road travel are completely random, the magnet will change its direction, velocity and acceleration parameters at random, too. Hence the energy output from the coils are computed at maximum velocity as an upper limit noting that road conditions can vary the velocity thereby varying the output based upon those conditions therefore, the output will have the appearance of a combination of different waveforms such as sine, triangular, square, sawtooth, pulse, and simple noise spikes both with positive and negative voltages.

A way to utilize the energy output of the coils with all these random waveforms is to first invert all the negative voltages to positive values by using a bridge rectifier mounted on a printed circuit board (PCB). Then, a capacitor can level out the changing positive voltages to a more averaged and level output of energy, basically a DC voltage.

FIG. 2 includes a representation of a possible power generation curve associated with employment of a vibration regen device. Since multiple devices may be employed, each at a different location on the vehicle, there may be a separate analysis of the performance of each, and each may be considered when calculating the prospective energy that can be retrieved from each separately.

The Thermoelectric Generators (TEG)

The Thermoelectric Generators are each is a solid-state device that converts thermal energy (heat) into electricity by a phenomenon called the Seebeck Effect, the electric potential build-up between two plates from a temperature gradient.

The Environmental and Safety Sensors

The Environmental and Safety Sensors are a collection of all the electrical/mechanical devices to detect events or changes in their environment and send the information to other electronics such as a computer processor or a database.

These may include weather sensors, vehicle position sensors, vehicle movement and acceleration sensors, sensors associated with vehicle systems, such as airbag deployment sensors, door lock sensors, interior air temperature and humidity sensors, driver position sensors, seat occupancy sensors, steering angle sensors, brake and braking sensors, tire pressure monitors, driver state sensors (holding the wheel?, eyes forward?, blink rate, etc.) as well as sensors for detecting vehicle path and potential objects outside of the vehicle that need to be considered for safe vehicle control and operation.

The Sensor Database

The Sensor Database is an organized collection of data stored and accessed electronically by a computer system. A description of the recent status of technology related to a sensor database is provided in United Stated Patent Number 10,552,460, issued Feb. 4, 2020 to Kuroda, "Sensor data management apparatus, sensor data management method, and computer program product". According to this patent, in recent years, sensor apparatuses that are connected to networks have been increasingly common as words such as IoT (Internet of things) and M2M (Machine-to-Machine) represent. When a massive amount of sensor data of various kinds is managed, a technique in which the data is managed on a sensor-to-sensor basis involves a risk of decreasing the processing speed. That is, in such a technique, sensor data is stored after data areas are secured for corresponding sensors, which means that the sensor data needs to be read out from a file stored in, for example, a hard disk drive (HDD) into a buffer on a memory and be written into a file from the buffer on a sensor-to-sensor basis. Consequently, when sensor data of multiple different sensors are successively accessed, the sensor data that are accessed is less likely on the buffer, and a large amount of read and write processing is incurred to the extent that decreases the processing speed.

To overcome this inconvenience, an attempt has been made to decrease the processing speed by dividing multiple sensors into groups and preparing two databases where a first one is configured to manage sensor data on a group-to-group basis and the other is configured to manage sensor data on a sensor-to-sensor basis. For example, the Specification of US Patent Published Application No. 2014/0122022 discloses a sensor data management apparatus configured to: store sensor data in a first database on a group-to-group basis when the sensor data is registered; and, when a certain amount of data has accumulated in the first database, transfer the sensor data stored in the first database to second databases prepared for the respective sensors.

This technique allows for reading and writing data between a buffer and each file on a group-to-group basis. Consequently, if multiple sensors can be grouped in a manner that allows the same group to consist of sensors that register sensor data at clock times close to one another, a high buffer hit rate can be achieved. When a large number of sensors are registered by various applications, however, this technique has difficulty appropriately grouping multiple sensors based on information provided by the applications beforehand; more specifically, this technique can appropriately group the sensors with respect to each application but has difficulty grouping the sensors across the applications, for example. When plural pieces of data are managed using one table, schemas of the managed sensor data need to be the same, and kinds of sensors that can be put into a group are therefore limited. Furthermore, one piece of sensor data is managed using a plurality of databases, which makes it necessary to establish a storage process and a search process for each of the two databases having different formats, resulting in a complicated mechanism.

The Dashboard Electronics

The Dashboard Electronics is an array of electronics with a control panel for the vehicle driver displaying instrumentation and controls for the vehicle's operation. While the number of dash instruments that can be displayed has been increasing in recent years, there is one common thread—the display shows some number of vehicle status indications such as speed, direction, outside temperature, fuel level, vehicle mileage, and more recently, indications of driver assist functions, such as lane departure warnings, the speed limit and a moving map showing vehicle position. Additionally, with a bit of manipulation of the display addition information can be displayed such as engine temperature, fuel level, tire pressures, heating and air conditioning settings, entertainment system status (as well as displaying the entertainment content being received). More and more display options are being added year by year. In addition to the actively displayed information, there are warning lights that appear only when a driver alert is deemed appropriate and there are audible warnings provided for safety warnings. Phone status and contact information is also available. For the most part, all of this information is available at all times and it is just up to the driver (or any vehicle occupant) to select which information is to be displayed.

In addition to the displays, there are dashboard instruments the operate as controls or switches, for instance for blinkers, lights and outside camera controls. All of these instruments consume some degree of power and this area has not been previously addressed as a power savings opportunity.

The Interaction of the Elements

The main Li-Ion Battery pack supplies electricity to the vehicle and is rechargeable by through multiple recharging options including the Hydrogen Fuel Cell, all the electrical regenerative sources, and through an off-vehicle charging station. The battery pack is also used to power on-board accessories and systems, including emergency systems such as 911 phone dialing and other services during an emergency. Control and protection of the battery pack is accomplished by the BMS, previously described.

The electric motors propel the vehicle controlled by a number of electronic systems such as the BMS, ECU, autonomous system controllers, power inverters, and power converters. The Hydrogen Fuel Cell individually can either recharge the Li-Ion Batteries or operate the electric motors through the ECU control or through the BMS or both. Regenerative sources of electricity are accomplished by Solar Films, Aero Regens, Vibration Regens, Thermoelectric Generator's, and the electric motors when in the mode of regeneration by coasting or braking. These regenerative sources are also controlled by the ECU. Environmental and safety sensors detect and store information to assist in the operation and safety of the vehicle. The Dashboard displays info about all the systems and allows control by the driver. The ECU, Dashboard, Sensors, Sensor Database, and any other onboard electronics can be powered by a normal 12-volt system that is recharged by any of the regenerative sources, as well as through the off-board charging system, whether with or without a DC-DC Converter or a AC-DC inverter.

The specific benefits of the invention can be achieved by analyzing each of the vehicle systems to assess and document, either through a database of values, or through equations defining the behavior of the system as the vehicle operates under varying conditions. The specific conditions to be analyzed relate to the power consumption of (or power generated by) each system as a function of the vehicle conditions. Thus, for an air conditioning system, the exterior temperature, the cabin temperature, the solar load, the state of the energy reserve in the battery system, the amount of hydrogen fuel in reserve, the planned route to be traveled and the available regenerative energy anticipated to be recaptured through the remainder of the planned route all contribute to determine the operating condition of the vehicle. The exterior temperature and solar load, including anticipated solar load through the remainder of the trip (calculated as a function of forecasted weather conditions) bear on the anticipated power needed for air conditioner operation The amount of energy used for air conditioning draws from the total energy available for completion of the planned route. In addition to the energy required, the system can assess the amount of energy that will be recaptured during completion of the planned trip. Thus, when air conditioning requirements are high due to solar load, it can be anticipated that solar cells will be producing higher than average regenerative energy, adding to the vehicle range. Taking all of the pertinent information into consideration, it can be determined how much energy will be needed by the air conditioning system through the remainder of the planned trip, assuming that the air conditioning system operates in its normal mode for the duration. This forms one component in the overall calculation of the total energy needed for trip completion.

The drive motors can be analyzed based on vehicle operating conditions as well. For instance, the speed at which the vehicle travels and the cumulative hill climbing and hill descents can be determined through evaluation of the planned trip as recorded in (or otherwise provided by) the vehicle navigation system. By characterizing the amount of energy needed to maintain the planned driving speed, and then adjusting the energy requirements for uphill and downhill segments of the trip, a baseline energy requirement can be calculated. Also, adding forecasted winds will allow improved assessment of the energy needed to overcome any headwinds, or might reduce the calculated energy required if the remainder of the trip is downwind.

Each vehicle system can be similarly analyzed, taking into consideration multiple factors that influence the energy requirements of the planned trip. The cumulative energy required can then be compared to the energy available in the vehicle battery system and a determination can be made as to whether there is sufficient energy available to complete the trip. Of course, for a long trip there is some degree of variability in the energy requirements. For instance, traffic jams or detours can greatly alter the amount of energy required to travel a planned route, particularly when auxiliary vehicle systems (air conditioning, windshield wipers, entertainment systems, communication systems and sensor systems) continue to draw power at levels that do not necessarily correspond to distance traveled. Thus, while travelling, it is desirable that the power management system continue to monitor the operating condition of the vehicle and the energy reserves available for completion of the trip. Thus, the determination of vehicle operating condition is an ongoing process, updated frequently or even on a continuing basis.

When all is going well and there is plenty of energy available for completion of the planned route, the power management system can simply confirm that all is well and allow all vehicle systems to operate in their ordinary manner. However, then conditions arise that might cause energy reserves to be inadequate, it is desirable for the power management system to start implementing changes in the power consumption levels of vehicle systems.

In one example, when the energy available for completion of a planned route falls below a first threshold, for instance 125% of the calculated energy needed to reach the planned vehicle destination might be feasible, as would setting a threshold of 120% or less of the energy required for completion of the planned trip, power conservation steps can be implemented. This can be done on a prioritized basis. In one example, in-cabin entertainment systems might be disabled, thereby reducing their power requirements to zero until it becomes clear to the system that the destination will be reached without exhausting the vehicles energy supply. However, disabling a vehicle system might not be feasible for higher priority systems, such as air conditioning. With air conditioning, it is possible to have a first energy reserve threshold, for instance 120% or less of the expected energy requirements, at which point the air conditioning system switches to a low power mode. Then, if vehicle operating conditions continue to deteriorate, perhaps dropping below a second threshold where the energy reserve drops to 110% or less of the energy required for completion of the planned trip, the air conditioning can be shut down. In this manner passenger comfort is preserved as long as possible, yet precautions are taken to avoid exhausting the vehicles energy supply. FIG. 2 shows a possible relationship of the power requirements for the AC system based on driving conditions such as the outdoor temperature and the desired cabin temperature as well as the selected fan speed. As can be seen, for a greater temperature differential outdoor vs desired cabin temperature, the greater the power requirement. Changing the fan speed shifts the power curve, showing how much power could be saved by reducing the power directed to the fan—setting it to low fan speed.

Numerous systems can be managed in this way without compromising vehicle safety, albeit passenger comfort is possibly impacted. Other possible systems to be stepped down in power consumption might include interior lighting, dash lighting, entertainment systems, exterior lighting, power seats, the speedometer and windshield wipers. When a vehicle is in fully autonomous mode, any systems that are for passenger convenience could be stepped down—possibly all the way down—to conserve energy for enabling completion of the planned trip. This might be the case, when a vehicle is in fully autonomous mode, for headlights, dashboard displays and windshield wipers if those systems are not needed for fully autonomous operation of the vehicle. Lower power lights might be needed to comply with laws and regulations, but at least the full power mode could be deselected in favor of lower power, or no power.

Another significant vehicle system that can be managed in an effort to extend vehicle range if reaching the planned destination becomes questionable at current operating conditions is the motor management system. This will cause vehicle operating conditions to change, thus impacting all of the other power saving calculations. Vehicle speed could be reduced to a speed where aerodynamic drag is greatly reduced and thus vehicle range is extended. Making a change of this sort will also allow recalculation of the operations of the aero regen system. As the vehicle speed declines, different operating characteristics of the aero regen system will result. Coordinating the aero regen controls with the new vehicle operating conditions can optimize the energy efficiency of the vehicle. As a final consideration, even some of the safety systems could be reduced in their functionality. Antiskid brakes and traction control might be the last to go, but disabling these functions can be feasible as a last resort. Thus, even if there has been a first threshold adjustment of vehicle systems, reducing power to certain low priority systems, and a second threshold adjustment of vehicle systems, reducing power to a second set of vehicle systems having a second priority, there can be a third threshold adjust reducing the power provided to still more vehicle systems. Also, as each incremental threshold is reached, incremental power reductions of previously reduced systems can be implemented. Since reducing vehicle speed is generally considered a major disruption of a planned trip, this step is preferably only implemented if energy reserves fall below a mission threshold—a level at which the destination can only be reached by taking such extreme measures. Typically, a mission threshold is less than or equal to 100% of the energy calculated as being required for completion of the planned trip. It might be less than 100% in situations where there is an alternative destination that could be selected, for instance for refueling.

As another example, illumination of dashboard displays can be reduced in response to the energy storage level falling below a first threshold, sensors for at least one of cabin temperature, windshield washer fluid level and automatic windshield wiper activation can be disabled in response to the energy storage level falling below a second threshold, and at least one of cabin heat, cabin air conditioning, interior lights, active suspension or cabin auxiliary power outlets can be disabled in response to energy storage level falling below a third threshold.

By having power requirement information for multiple vehicle systems and power generation information for the regen systems, it is possible to calculate optimum range extending options as driving conditions evolve. Having the ability to allow all of the systems to operate normally when there is ample energy available, and also having the ability to reduce the power supplied to individual ones of the vehicle system when energy levels are not ample provides significant benefits over systems that simply try to have everything operate at its most efficient level. Sometimes a lower power operation (not peak efficiency) for some vehicle systems is better for the overall vehicle than running every system at its individual optimum efficiency.

Deciding when to begin taking energy conservation steps is an important consideration in providing a commercially viable vehicle. Vehicle operators wouldn't accept a vehicle that frequently shuts down all of the convenience and comfort systems only to reach their destination with an ample energy reserve. Thus, establishing a suitable threshold might be a consumer preference item. This can be done in a first mode by allowing the consumer to set a threshold, below which vehicle systems start to drop to lower power operating modes. Then the consumer might have the option to prioritize which systems are shut down first, and which are to be kept operational as long as possible. Thus, someone with a high interest in music, and no interest in reading, can set interior lights to be depowered before the entertainment system. Also, someone who I familiar with the intended route might be willing to accept an arrival with a lower final energy reserve than would be the case for someone who is not familiar with the route. This can be addressed by allowing the vehicle operator to select a reserve threshold level, for instance equal to 120% of the calculated energy required for completion of the route. Also, instead of considering the energy required to complete a trip, it is possible to start power reductions when the stored energy in the main battery system falls below some predetermined threshold, for instance 75% for a first set of power reductions and 25% for a more aggressive set of power reductions. For other circumstances, such as for short trips close to home, or trips where there is a high degree of confidence in the projected energy requirements, a threshold for adjusting power to certain systems could be set for 10% of the main battery system storage capacity.

Another consideration is the impact of traffic delays. Since delays are frequently unpredictable, having a threshold set as a function of traffic delays can significantly aid in protecting a vehicle from running out of energy short of the destination. As an example, if the traffic delay is projected to deplete 25% (or some other threshold level) of the energy reserve, the power management system can be set to conclude that there is a risk to completion of the trip and power reduction measures can be implemented. In similar fashion, if a traffic delay is encountered that delays a trip by more than a delay threshold, perhaps 10%, of the time originally calculated as the duration of the trip, it can be indicative of the need to take precautionary steps and to introduce a first set of power reductions.

While the foregoing has addresses the planned route, it is to be recognized that the power management system, in concert with a vehicle navigation system, can determine that the original destination is not reliably reachable, even with all the available power mitigation steps possible. In this case a new route can be planned, where the destination is within reach. A typical new destination might be a refueling (re-powering) facility.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa. Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A method of managing power consumption in an electrically powered motor vehicle, said method comprising:
creating a database of vehicle system power requirements as a function of vehicle operating conditions,
creating a priority ranking for vehicle systems, monitoring the vehicle's energy storage level relative to calculated energy required for completion of a planned route, reducing, through operation of a power management system, the power supplied to individual ones of said vehicle systems in accordance with said priority ranking when the energy storage level falls below a first threshold and reducing the power supplied to additional ones of said vehicle systems in accordance with said priority ranking when the energy storage level falls below a second threshold lower than the first threshold;

wherein reducing the power supplied to individual ones of said vehicle systems includes partially reducing the power supplied to at least one of the individual ones of said vehicle systems when the energy storage level falls below the first threshold, and then further reducing the power supplied to the at least one of the individual ones of said vehicle systems when the energy storage level falls below the second threshold;

reducing, via the power management system, vehicle speed when the energy storage level falls below a third threshold lower than the second threshold;

wherein the third threshold is a first value of the calculated energy if the power management system determines that no refueling station is within the planned trip; and wherein the third threshold is set to a second value of the calculated energy lower than the first value if the power management system determines that a refueling station is present along the planned trip.

2. The method as claimed in claim 1, wherein illumination of dashboard displays is reduced in response to the energy storage level falling below said first threshold, wherein sensors for at least one of cabin temperature, windshield washer fluid level, and automatic windshield wiper activation are disabled in response to the energy storage level falling below said second threshold, and wherein cabin heat, cabin air conditioning, interior lights, active suspension and cabin auxiliary power outlets are disabled in response to energy storage level falling below the third threshold.

3. The method as claimed in claim 1, wherein the priority ranking for a plurality of vehicle systems is adjustable by a vehicle operator.

4. The method as claimed in claim 1, wherein vehicle speed is reduced if the energy storage level relative to the calculated energy required for completion of a planned route falls below a mission threshold.

5. The method as claimed in claim 4, wherein said mission threshold is determined as a function of vehicle battery reserve energy and anticipated traffic conditions.

6. The method as claimed in claim 4, wherein said planned route is automatically altered in the event that the power management system determines that there is inadequate energy reserve to reach the conclusion of the planned route, and wherein a power charging facility is automatically set as an updated destination.

7. The method as claimed in claim 1, wherein vehicle passengers are informed via a dashboard display of energy conservation steps being implemented by said power management system.

8. The method as claimed in claim 1, wherein the first threshold is 125% of the calculated energy needed to reach the planned vehicle destination.

9. The method as claimed in claim 1, wherein the vehicle operating conditions include a projected traffic delay exceeding 25% of the reserve battery energy.

10. The method as claimed in claim 1, wherein the calculated energy required for completion of the planned trip is determined as a function of the vehicle operating conditions and continually updated by the power management system.

11. The method as claimed in claim 1, wherein monitoring the vehicle's energy storage level includes analyzing, via the power management system, the power consumption of the vehicle systems as a function of the vehicle operating conditions.

12. The method as claimed in claim 11, wherein the vehicle systems include an air conditioning system, and wherein the vehicle operating conditions for the air conditioning system include exterior temperature, cabin temperature, solar load including anticipated solar load through the remainder of the planned trip, and an available regenerative energy anticipated to be recaptured through the remainder of the planned trip.

13. The method as claimed in claim 12, wherein the power management system reduces the power supplied to a fan of the air conditioning system to lower a fan speed thereof when the energy storage level falls below the first threshold, and the power management system disables the power supplied to the air conditioning system when the energy storage level falls below the second threshold.

14. The method as claimed in claim 11, wherein the vehicle systems include drive motors, and wherein the vehicle operating conditions include a speed of the vehicle, cumulative hill climbing and hill descents through the planned trip, and forecasted wind direction.

15. The method as claimed in claim 1 wherein the power management system via a vehicle navigation system selects a new route with an alternative destination when the destination of the planned trip is determined to be no longer within reach after the energy storage level falls below the third threshold.

16. The method as claimed in claim 1, wherein the power supplied to the individual ones of said vehicle systems is partially reduced when the energy storage level falls below the first threshold, and then the power supplied to the individual ones of said vehicle systems is further reduced in addition to reducing the power supplied to the additional ones of said vehicle systems when the energy storage level falls below the second threshold to provide incremental power reductions of previously reduced systems as each incremental threshold is reached.

* * * * *